United States Patent [19]

Henrikson

[11] Patent Number: 4,521,152
[45] Date of Patent: Jun. 4, 1985

[54] APPARATUS FOR EXTRACTING AT LEAST THE INHERENT KINETIC ENERGY FROM WAVES

[76] Inventor: Stig A. Henrikson, 21, Fleminggatan, Stockholm S-112 26, Sweden

[21] Appl. No.: 474,678
[22] PCT Filed: Jun. 21, 1982
[86] PCT No.: PCT/SE82/00226
§ 371 Date: Feb. 15, 1983
§ 102(e) Date: Feb. 15, 1983
[87] PCT Pub. No.: WO83/00058
PCT Pub. Date: Jan. 6, 1983

[30] Foreign Application Priority Data
Jun. 25, 1981 [GB] United Kingdom ............... 8119599

[51] Int. Cl.³ .................................................. F03B 13/12
[52] U.S. Cl. ........................................ 415/2 R; 415/7
[58] Field of Search ................... 415/7, 2 R; 60/398

[56] References Cited

U.S. PATENT DOCUMENTS

| 1,308,649 | 7/1919 | Watkins | 415/7 |
| 1,474,571 | 11/1923 | Wielgolaski | 415/2 |
| 3,644,052 | 2/1972 | Lininger | 415/7 |
| 3,983,404 | 9/1976 | Sherrard | 417/330 X |
| 4,078,871 | 3/1978 | Perkins | 60/398 X |
| 4,137,005 | 1/1979 | Comstock | 415/3 X |
| 4,172,689 | 10/1979 | Thorsheim | 60/398 X |
| 4,179,886 | 12/1979 | Tsubota | 60/398 |
| 4,263,516 | 4/1981 | Papadakis | 290/53 |
| 4,296,602 | 10/1981 | Hales et al. | 60/398 |

FOREIGN PATENT DOCUMENTS 2289763 5/1976 France .
69769 5/1980 Japan ..................... 415/7

Primary Examiner—Everette A. Powell, Jr.
Attorney, Agent, or Firm—Shapiro and Shapiro

[57] ABSTRACT

The present invention relates to an apparatus for extracting the inherent kinetic energy from water particles moving in substantially circular paths within waves. It comprises a coherent intake plane (1) extending continuously from the intake side (2) to the outtake side (3), along which intake plane the waves are to roll freely from the intake side (2) to the outtake side (3). A duct (5) includes an entrance portion connected to the plane (1) and directed substantially beneath the plane toward the intake side (2). The entrance portion defines a depression (4) into which the waves fall, breaking the water particles from their respective circular paths and causing them to flow in substantially the same direction in the duct (5) for delivery to an associated energy converter.

7 Claims, 2 Drawing Figures

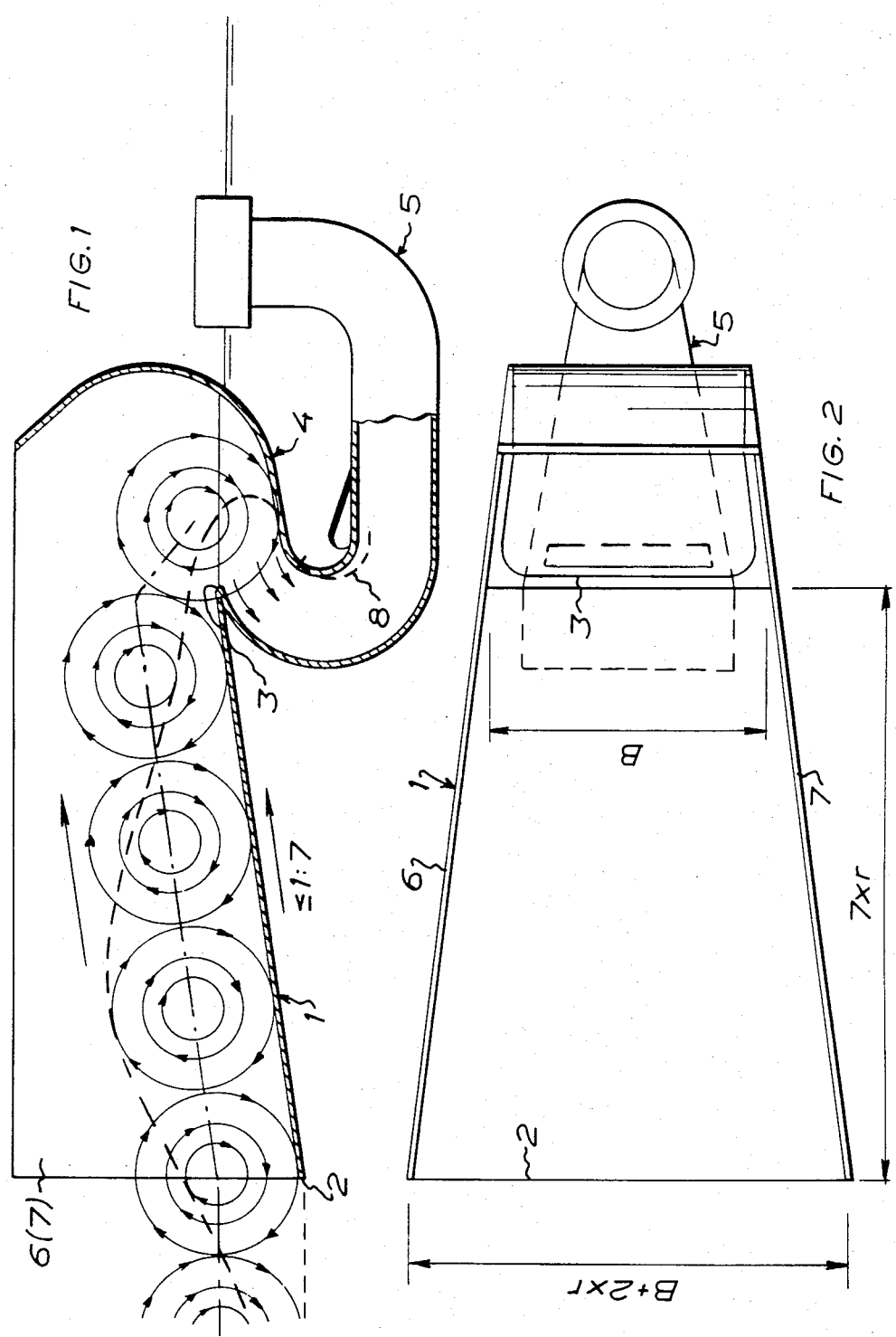

APPARATUS FOR EXTRACTING AT LEAST THE INHERENT KINETIC ENERGY FROM WAVES

The energy contained in a wave consists on one hand of the potential energy required to form the water surface and on the other hand the kinetic energy corresponding to the sum of the kinetic energies of the individual water particles when moving in circular paths.

Thus the present invention relates to an apparatus for extracting at least the inherent kinetic energy from waves, characterized by comprising a coherent intake plane extending continuously from the intake side to the outtake side, along which plane the waves are to roll freely from the intake side to the outtake side and, provided at the outtake side of the intake plane, a depression which, via a sharp front edge of the intake plane, merges in a duct directed backwardly in such a way that the inherent kinetic energy of the waves is released in that the water particles travelling forwards in the direction of the wave motion as well as those travelling backwards, which rotate in circular paths, are caused to flow in one direction through the duct for delivery to an energy converter, for instance a turbine.

The kinetic energy inherent in a wave consists more exactly, of particles which rotate in circular or deformed circular paths with the external diameter in the vertical sense equal to the height of the wave, i.e. the difference between wave crest and wave trough. The speed of the wave in the horizontal sense of movement is considerably lower than the rotational speed of the water particles in the circular paths of the inherent energy. When the wave in a certain section has travelled up to the depression of the apparatus the wave drops vertically downwards while the rotating water particles of the inherent energy in the circular paths are broken loose from their paths and are forced to change direction of movement at retained speed. To this effect the apparatus is so designed that the changed movement of the water particles is caught and conducted via the duct to the energy converter. When the wave drops abruptly at the depression of the apparatus, specifically the inherent energy of the water particles moving backwards at the bottom of the circular movement is released and is accompanied by the particles travelling forwards and downwards at the top of the same circular movement and are all conducted towards the energy converter, which preferably consists of a turbine.

The height of the steep depression of the apparatus is to be equal to or less than the radius of the circles situated on a wavelength and being about 8 in number. This applies to the size of an average wave measured on the coast area where the apparatus is to be placed. If the wave is larger than this average wave, the inherent energy in connection with the circulation centre will not be utilized but this gives only a rather slight loss of rotational energy.

The invention will be described more fully with reference to the accompanying drawing which schematically shows an embodiment of the apparatus according to the invention.

In the drawing,

FIG. 1 is a side view of the apparatus as seen in cross-section, submerged in water; and FIG. 2 is a top view of the apparatus.

The intake plane, designated 1, is coherent and extends continuously from the intake side 2 to the outtake side 3. The waves are to roll freely along the intake plane 1 from the intake side 2 to the outtake side 3. In accordance with the invention, a duct 5 is connected to intake plane 1 and includes an entrance portion directed substantially beneath the plane toward the intake side 2. A wall of the entrance portion of duct 5 merges with the edge of plane 1 at the outtake side 3 and forms a sharp angle therewith, as shown in FIG. 1. The entrance portion of the duct further defines a depression 4, into which the waves fall after passing over plane 1. The water may then be delivered via duct 5 to associated energy converting means such as turbine or the like, as will be apparent to those skilled in the art.

The intake plane 1 inclines upwards, as counted from the intake side 2, this inclination being at most 1:7. Via the sloping intake plane 1 the waves should be lifted no less than half the wave height, i.e. at least corresponding to the radius r, which is the radius of the circular-cylindrical paths which the water particles describe during the movement of the waves. The length of the inclined intake plane 1 will thus be at least $7 \times r$.

If the width of the energy-producing part is B it is possible, by inclining the side edges 6 and 7 of the sloping intake plane 1 by an angular change of 1:7, as counted from the direction of movement of the waves, to increase the intake side 2 or the intake width for the waves to $B + 2 \times r$, where the length of the intake plane 1 still is $7 \times r$. Thus the side edges 6 and 7 converge towards the outtake side 3. An assembly with the width B thus covers a length of $B + 2 \times r$ of the wave front.

As is apparent from the drawing the duct 5 with the energy converter extends ahead of the intake plane 1 as counted in the direction of movement of the waves. The duct 5 has a successively diminishing section up to the energy converter, which means that the speed of the water body increases up to said converter.

The depression 4 situated after the outtake side 3 of the intake plane 1 has, as appears from the foregoing description, such a configuration that the backwardly moving water particles, situated under the centre of rotation, are taken care of during the circular-cylindrical movement and canalized in the same forward direction as those situated above the centre of rotation. This takes place in the duct 5.

When a wave trough after the already passed wave crest arrives in the depression 4, the incoming water quantity diminishes to zero. Due to the outer water pressure around the duct 5 a flap 8 arranged in the duct 5 opens, whereby replacement water is sucked in. The intake suction is produced by the suction power arising after the water body from the immediately preceding wave crest has passed the system. Moreover, the flap 8 is adapted to shut against the surrounding water when water will again flow into the duct 5, i.e. when the water body of the next wave crest flows into the system.

Canalization of potential energy as well as inherent kinetic energy will then take place at a time in the duct 5 up to somewhat above the level of the slack-water surface via e.g. turbine and is discharged on the slack-water side of the apparatus.

The apparatus is adjustable so as to adapt itself to changes in the slack-water surface. Furthermore, the inclination of the intake plane 1 is adjustable so as to adapt itself to the wave height. Thus the outtake side 3 of the intake plane 1 is to lie on level with the slack-water surface at the back of the apparatus, or higher, while the intake side 2 of the intake plane 1 is to be on level with the wave trough.

In a preferred embodiment the apparatus is mounted on floats or like means which preferably are applied leeward of the wave front so as to adapt itself to the slack-water surface on the lee-side.

According to the drawing the sharp front edge of the intake plane 1, over which the wave drops down, is straight. However, it may also be shaped in another way. Thus it may be bow-shaped. The latter configuration may be used when it is a matter of catching the inherent energy of water particles moving in circular or elliptic paths because the movements do not exactly agree with the direction of movement of the wave but at an angle thereto which is between 0° and 90°. These water particles will have a higher rotational speed than the particles moving in circular paths in the direction of movement of the wave. Especially in this case, when the front edge in the intake plane 1 is curved, it is advisable to provide the intake plane 1 with the inclined side edges 6 and 7 which converge towards the outtake side 3 with the depression 4.

The invention is not limited to that described above and shown in the drawing but may be modified within the scope of the appended claims.

I claim:

1. Apparatus for extracting inherent kinetic energy from water particles moving in substantially circular paths within waves, comprising a coherent plane extending continuously from an intake side to an outtake side for the passage of waves freely thereover, said plane being upwardly inclined toward said outtake side with an inclination not more than 1-to-7, and a duct including an entrance portion directed substantially beneath said plane toward said intake side, a wall of said entrance portion merging and forming a sharp angle with the edge of said plane at said outtake side, said entrance portion being configured to define a depression adjacent said edge of said plane so that waves passing over said edge fall into said depression, whereby said water particles are caused to be broken from their respective paths and to flow in substantially the same direction in said duct for delivery to associated energy converter means.

2. Apparatus as claimed in claim 1, wherein said plane has inclined side edges converging towards the outtake side.

3. Apparatus as claimed in claim 1, wherein the duct, includes a flap adapted to open to surrounding water when suction arises in the duct.

4. Apparatus as claimed in claim 3, wherein the flap is adapted to shut against the surrounding water when water from a wave which has passed over said plane flows into the duct.

5. Apparatus as claimed in claim 1, which is supported on float means leeward of the wave fronts so as to adapt to the slack-water surface on the lee-side.

6. Apparatus as claimed in claim 5, wherein the inclination of said plane is adjustable for adapting to the wave height.

7. Apparatus as claimed in claim 2, wherein the edge of said plane at said outtake side is curved.

* * * * *